(12) United States Patent
Li et al.

(10) Patent No.: US 9,739,984 B2
(45) Date of Patent: Aug. 22, 2017

(54) F-THETA LENS AND LASER PROCESSING DEVICE FOR FAR-INFRARED LASER PROCESSING

(71) Applicants: HAN'S LASER TECHNOLOGY CO., LTD., Guangdong (CN); HAN'S CNC SCIENCE AND TECHNOLOGY CO., LTD, Guangdong (CN)

(72) Inventors: Jiaying Li, Shenzhen (CN); Chaoming Zhou, Shenzhen (CN); Bo Sun, Shenzhen (CN); Yunfeng Gao, Shenzhen (CN)

(73) Assignees: HAN'S LASER TECHNOLOGY INDUSTRY GROUP CO., LTD., Shenzhen (CN); HAN'S CNC SCIENCE AND TECHNOLOGY CO., LTD, Shenzhen (CN)

( * ) Notice: Subject to any disclaimer, the term of this patent is extended or adjusted under 35 U.S.C. 154(b) by 115 days.

(21) Appl. No.: 14/439,410

(22) PCT Filed: Oct. 31, 2012

(86) PCT No.: PCT/CN2012/083845
§ 371 (c)(1),
(2) Date: Apr. 29, 2015

(87) PCT Pub. No.: WO2014/067097
PCT Pub. Date: May 8, 2014

(65) Prior Publication Data
US 2015/0293333 A1    Oct. 15, 2015

(51) Int. Cl.
*G02B 13/14* (2006.01)
*G02B 13/00* (2006.01)
(Continued)

(52) U.S. Cl.
CPC ......... *G02B 13/14* (2013.01); *G02B 13/0005* (2013.01); *B23K 26/0648* (2013.01);
(Continued)

(58) Field of Classification Search
CPC .. G02B 13/0005; G02B 13/14; B23K 26/382; B23K 26/0648; B23K 26/0665; B23K 26/38
(Continued)

(56) References Cited

U.S. PATENT DOCUMENTS

| | | | |
|---|---|---|---|
| 6,324,015 B1* | 11/2001 | Fuse | B23K 26/0643 359/206.1 |
| 2011/0038062 A1* | 2/2011 | Li | B23K 26/0648 359/739 |
| 2011/0043931 A1* | 2/2011 | Li | G02B 9/12 359/739 |

FOREIGN PATENT DOCUMENTS

| | | |
|---|---|---|
| CN | 101093275 A | 12/2007 |
| CN | 101369047 A | 2/2009 |

(Continued)

OTHER PUBLICATIONS

Hecht "Optics" pp. 234-235, 1987.*

(Continued)

*Primary Examiner* — Jordan Schwartz
*Assistant Examiner* — George G King
(74) *Attorney, Agent, or Firm* — Polsinelli PC

(57) ABSTRACT

An Fθ lens and a laser processing device for far-infrared laser processing are provided. The Fθ lens for far-infrared laser processing comprises a first lens (L1), a second lens (L2) and a third lens (L3) which are coaxially arranged successively along a transmission direction of incident light beams, wherein the first lens is a negative meniscus lens, and the second lens and the third lens are positive meniscus (Continued)

lenses; and all the middle parts of the first lens, the second lens and the third lens protrude towards the transmission direction of incident light beams. The Fθ lens can improve the imaging quality and the resolution distance, effectively calibrate the astigmatism and distortion of the lens, reduce the influence of high-order aberrations, and has a high degree of energy concentration of laser focus points and high processing accuracy, thereby meeting the requirements for cutting or drilling. The Fθ lens is miniaturized, so that the volume of the lens is effectively controlled, and costs are reduced.

9 Claims, 5 Drawing Sheets

(51) Int. Cl.
    *B23K 26/06*     (2014.01)
    *B23K 26/38*     (2014.01)
    *B23K 26/382*     (2014.01)

(52) U.S. Cl.
    CPC .......... *B23K 26/0665* (2013.01); *B23K 26/38* (2013.01); *B23K 26/382* (2015.10)

(58) Field of Classification Search
    USPC ............... 359/356, 357, 355, 771, 774, 776, 359/781–784
    See application file for complete search history.

(56) References Cited

FOREIGN PATENT DOCUMENTS

| | | |
|---|---|---|
| CN | 101639565 A | 2/2010 |
| CN | 102313968 A | 1/2012 |
| JP | H01130115 A | 5/1989 |
| JP | 6-109995 | 4/1994 |
| JP | 6-214153 | 8/1994 |
| JP | H0990216 A | 4/1997 |
| JP | 2004126194 A | 4/2004 |
| JP | 2011-519067 | 6/2011 |
| JP | 2011-519069 | 6/2011 |

OTHER PUBLICATIONS

International Search Report dated Jun. 6, 2013.
Supplementary European Search Report dated Jun. 22, 2016 from European Patent Application No. 12887391.6, pp. 1-8.

\* cited by examiner

F-THETA LENS AND LASER PROCESSING DEVICE FOR FAR-INFRARED LASER PROCESSING

CROSS-REFERENCE TO RELATED APPLICATIONS

This application is a National Phase filing under 35 U.S.C. §371 of PCT/CN2012/083845 filed on Oct. 31, 2012, the entire contents of which is hereby incorporated by reference.

FIELD OF THE INVENTION

The present disclosure relates to a field of optical technology, and more particularly relates to an F θ lens and laser processing device for far-infrared laser processing.

BACKGROUND OF THE INVENTION

As the development of the laser processing technology, the laser machine for high-power cutting is extensively applied to the field of heavy industry. In order to cut a thick (about 50 mm) steel plate, a high-power laser is required. At present, the high-power laser which is mature and has a highest performance cost ratio is the $CO_2$ laser. The laser has a power reaching 5000-10000 watts, or even greater. However, the working wavelength of the $CO_2$ laser is too long, such as the wavelength $\lambda=10640$ nm (10.64 μm); it can be concluded according to the Rayleigh rule that:

The theoretic resolution distance for laser cutting $d=2.44\lambda f/D$.

Wherein d represents a minimum resolution distance between two points;

$\lambda$ represents a wavelength of the processing laser;

f represents a focal length of the optical lens;

D represents an entrance pupil diameter of the optical lens.

The wavelength is 10 times of a common use wavelength 1064 nm, the resolution ratio of the laser is just one-tenth of the wavelength 1064 nm, causing the cutting accuracy to reduce. As shown in above formula, if the resolution ratio is to be enhanced, the focal length is required to decrease or the entrance pupil diameter is required to increase. However, increasing the entrance pupil diameter leads to a sharply increasing of the volume of the lens sharply, and enhancement of the resolution is not so obvious. Therefore, under the premise of controlling the volume, meeting a requirement of high resolution remains a design problem of the Fθ lens for far-infrared laser cutting.

SUMMARY OF THE INVENTION

Technology Problem

It is an object of the present invention to provide an Fθ lens for far-infrared laser processing, which meets a requirement of precision cutting and drilling, while ensuring a miniaturization of the lens at the same time.

Technology Solution

It is accomplished as follows: a Fθ lens for far-infrared laser processing, comprising an first lens, a second lens, and a third lens, which are coaxially arranged successively along a transmission direction of an incident light beam;

wherein the first lens is a negative meniscus lens, the second and the third lens are positive meniscus lenses, middle portions of the first, the second and the third lens protrude toward the transmission direction of the incident light beam.

It is necessary to further provide a laser processing device, including a far-infrared laser and an optical lens configured to focus the far-infrared laser to perform a laser processing, wherein the optical lens is the described Fθ lens for far-infrared laser processing.

Advantages

By designing the lens according above structure, on one hand, the Fθ lens enables the imaging quality and the resolution distance to reach an ideal extent, effectively calibrating the astigmatism and distortion, reducing the influence of high-order aberrations, and the Fθ lens has a high degree of energy concentration of laser focus points and high processing accuracy, thereby fully meeting the requirements for cutting or drilling; on the other hand, the volume of the lens is effectively controlled. The Fθ lens is a miniaturized far-infrared Fθ lens which has a far-reaching significance to the fabricating of the far-infrared lens.

DETAILED DESCRIPTION OF THE EMBODIMENTS

These and other features of the invention will become readily apparent upon further review of the following specification and drawings. The various embodiments of the invention may, however, be embodied in many different forms and should not be construed as limited to the embodiments set forth herein.

The following detailed description refers to the accompanying drawings that show, by way of illustration, specific details and embodiments in which the invention may be practiced.

Figure 1:
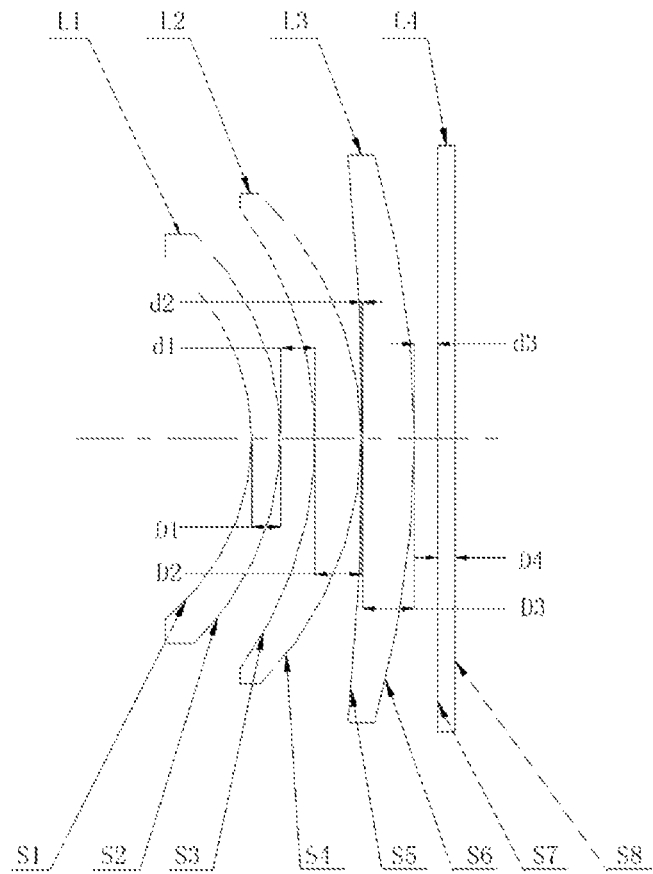
FIG. 1 is a schematic view of an Fθ lens for far-infrared laser processing according to an embodiment of the invention.

FIG. 1 is a schematic view of an Fθ lens for far-infrared laser processing provided by an embodiment of the invention. In order to facilitate illustration, FIG. 1 merely shows a portion of the Fθ lens for far-infrared laser processing associated with the embodiment.

The Fθ lens for far-infrared laser processing includes a first lens L1, a second lens L2, and a third lens L3 which are coaxially arranged successively along a transmission direction of the incident light. The first lens L1 is a negative meniscus lens. Both the second lens L2 and the third lens L3 are positive meniscus lenses, radius of curvature of the incident surface of the first lens L1 is less than radius of curvature of the emergent surface of the first lens L1. Radiuses of curvature of the incident surfaces of the second and the third lenses are greater than radiuses of curvature of the emergent surfaces, i.e. the middle portions of the second lens L2 and the third lens L3 protrude toward the transmission direction of the incident light beam, i.e., protruding toward the image side.

In addition, the material of the first lens L1, the second lens L2, and the third lens L3 can be a glass material.

Further, parameters such as the surface curvatures and the thicknesses of the lenses are optimized in the embodiment. Specifically, the first lens L1 includes a first surface S1 and a second surface S2, the radiuses of curvature of the first surface S1 and the second surface S2 are −50 mm and −60 mm, respectively; the second lens L2 includes a third surface S3 and a fourth surface S4, the radiuses of curvature of the third surface S3 and the fourth surface S4 are −68 mm and −50 mm, respectively; the third first lens L3 includes an fifth surface S5 and a sixth surface S6, the radiuses of curvature are −500 mm and −180 mm, respectively; The minus indicates that a spherical center of the curved surface is located at the object side of the curved surface, numeral value without plus or minus represents a plus, the plus indicates that a spherical center of the curved surface is located at the image side of the curved surface. Above described first surface to sixth surface are arranged successively along the transmission direction of the laser, and each above described radius of curvature is not the only choice and has a tolerance range of 5%.

Furthermore, the center thicknesses D of the first lens to the third lens, and the distance d between the surfaces are particularly designed in the embodiment. Specifically, the center thicknesses D1, D2, and D3 of the first to the third lenses are 5 mm, 8 mm, and 8 mm, respectively, and each has a tolerance range of 5%. Further, a distance d1 on the optical axis between the second surface S2 of the first lens L1 and the third surface S3 of the second lens L2 is 5 mm; a distance d2 on the optical axis between the fourth surface S4 of the second lens L2 and the fifth surface S5 of the third lens L3 is 0.5 mm. Above surface distances have a tolerance of 5%.

After the lens is designed with radiuses R of the first to third lens, the center thicknesses D of the lens, and the surface distances d, a better imaging quality and a better laser marking precision are obtained. Further, in the embodiment, a fourth lens L4 is additionally positioned on the light emergent side of the third lens L3. Preferably, the fourth lens L4 is an flat lens, and includes an seventh surface S7 and an eighth surface S8, the radiuses of curvature of the seventh surface S7 and the eighth surface S8 are ∞; the fourth lens L4 is mainly applied to protect the other imaging lenses, avoiding the other imaging lenses from affected by dust, moisture, high temperature and low temperature and so on.

In detail, the fourth lens L4 may be made of material same as the other lens. The center thickness D4 of the fourth lens L4 can be 3 mm, the tolerance is 5%. In addition, a distance d3 on the optical axis between the seventh surface S7 of the fourth lens L4 and the sixth surface S6 of the third lens L3 is 4 mm, the tolerance is 5%.

An Fθ lens having specific structures for far-infrared laser processing is provided as follows, please referring to table 1 for details.

TABLE 1 structural parameter of the Fθ lens for far-infrared laser processing

| L (lens) | S (surface) | R (radius of curvature) | d (distance between surfaces) | D (center thickness) | Nd/Vd (material) |
|---|---|---|---|---|---|
| 1 | 1 | −50 | | 5 | 1.74/0.026 |
| | 2 | −60 | 5 | | |
| 2 | 3 | −68 | | 8 | 1.74/0.026 |
| | 4 | −50 | 0.5 | | |
| 3 | 5 | −500 | | 8 | 1,74/0.026 |
| | 6 | −180 | 4 | | |
| 4 | 7 | ∞ | | 3 | 1.74/0.026 |
| | 8 | ∞ | | | |

The Fθ lens for far-infrared laser processing has optical characteristics as follows:

The optical wavelength $\lambda=10640$ nm;
The focal length $f=160$ mm;
The entrance pupil diameter $D_{in}=30$ mm;
The processing range $A=100*100$ mm$^2$
The visual field angle $2\omega=50°$;
The maximum external diameter of the optical material $D_{max}=100$ mm;
The total length of the lenses $L_{total}=100$ mm On one hand, the Fθ lens enables the imaging quality and the resolution distance to reach an ideal extent, effectively calibrating the astigmatism and distortion, reducing the influence of high-order aberrations, and the Fθ lens has a high degree of energy concentration of laser focus points and high processing accuracy, thereby fully meeting the requirements for cutting or drilling; on the other hand, the volume of the lens is effectively controlled, the optical total length is reduced to 100 mm, the maximum external diameter is merely 100 mm. The Fθ lens is a miniaturized far-infrared Fθ lens which has a far-reaching significance to the fabricating of the far-infrared lens.

The imaging quality of the Fθ lens for far-infrared laser processing is analyzed with reference to FIG. 2 through 6, from different perspectives.

Figure 2:
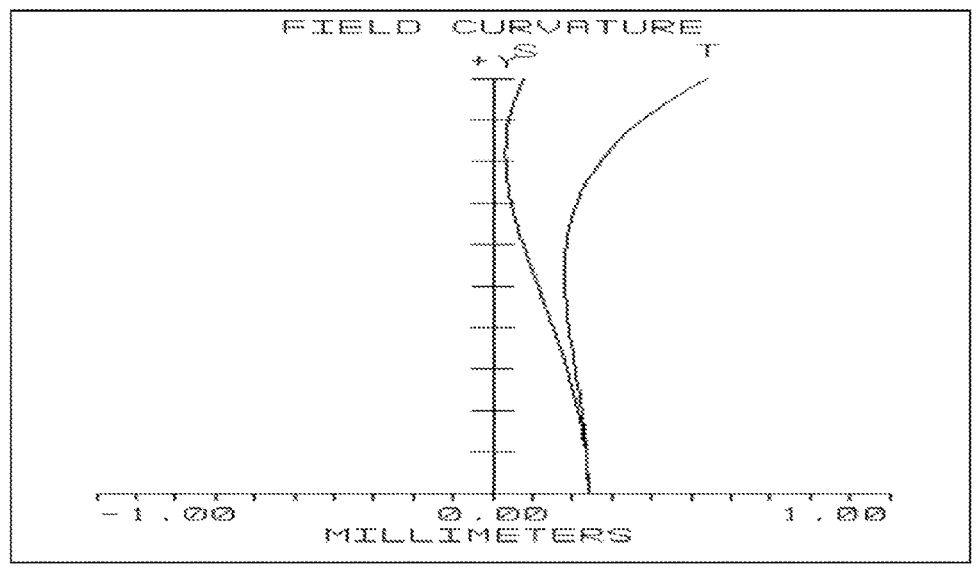
FIG. 2 is a graph illustrating astigmatism of an Fθ lens for far-infrared laser processing according to an embodiment of the invention
Figure 3:
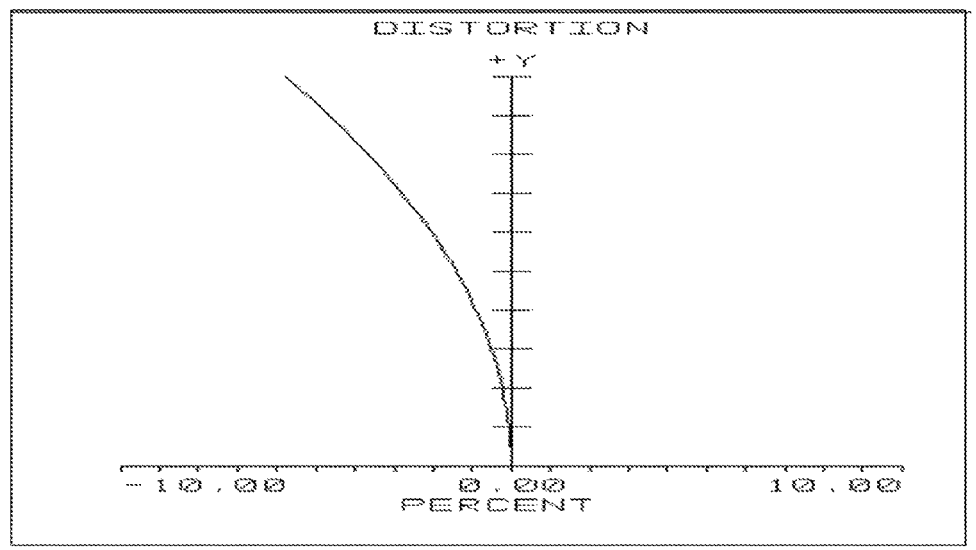
FIG. 3 is a graph illustrating a distortion of an Fθ lens for far-infrared laser processing according to an embodiment of the invention.

FIG. 2 and FIG. 3 respectively presents astigmatism and distortion of the Fθ lens for far-infrared laser processing, the unit of the horizontal axis is μm, the vertical axis represents a distance from a center to an edge along the meridian direction. Both reach or are less than a theoretical value, the theoretical value is 13.5 μm.

Figure 4:
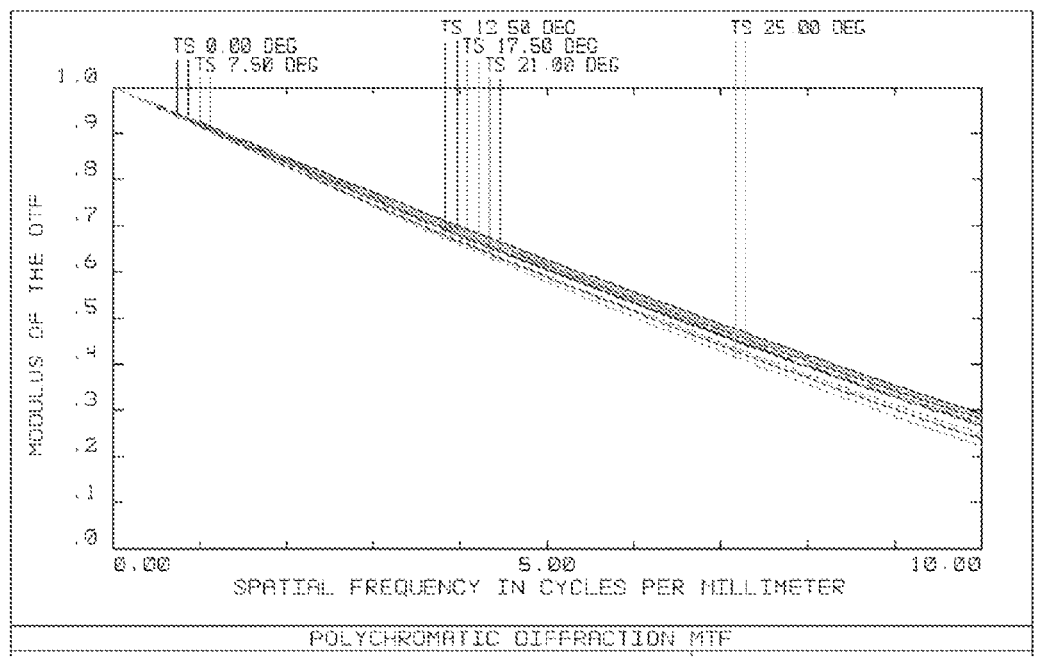
FIG. 4 is a graph illustrating an optical transfer function M.T.F characteristic of an Fθ lens for far-infrared laser processing according to an embodiment of the invention.

FIG. 4 represents an optical transfer function M.T.F, the vertical axis indicates percentage, the horizontal axis indicates the visual field. When the resolution reaches 10 lp/mm (10 line pairs), the M.T.F is still more than 30%. There are no significant difference between the axial points and the off-axial points, and the imaging effect is stable, achieving an aiming of flat visual field.

Figure 5:
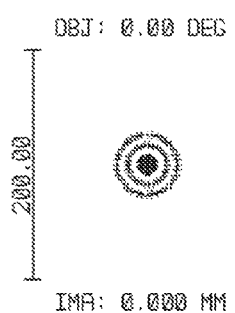
FIG. 5 are spot diagrams of an Fθ lens for far-infrared laser processing according to an embodiment of the invention.
Figure 5:
Figure 5:
Figure 5:
Figure 5:
Figure 5:
Figure 6:
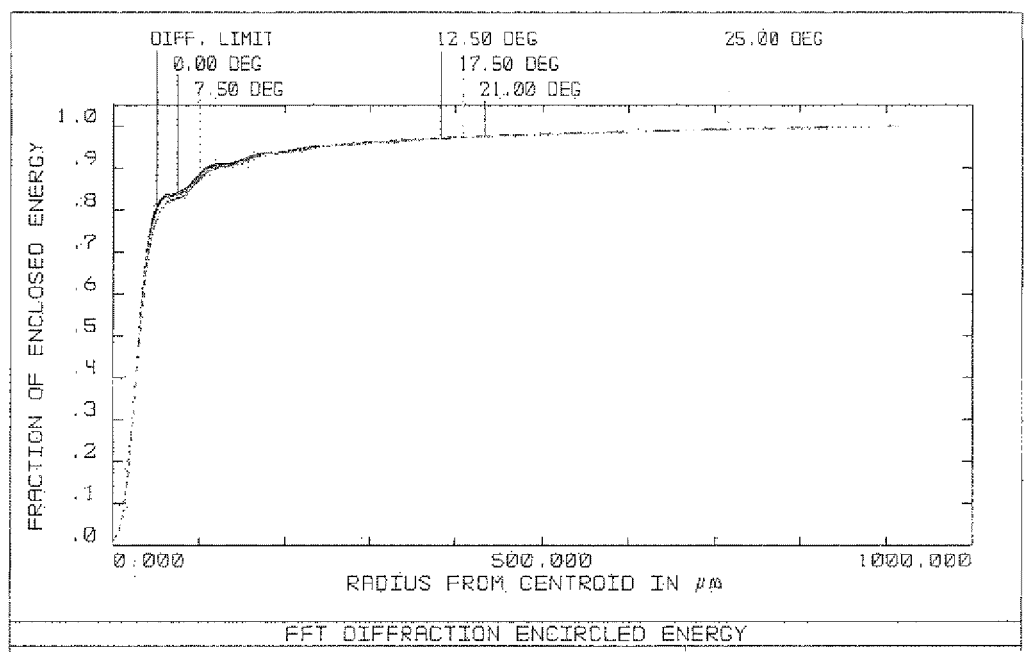
FIG. 6 is a graph illustrating an energy concentration degree characteristic of an Fθ lens for far-infrared laser processing according to an embodiment of the invention.

FIG. 5 and FIG. 6 respectively represent spot diagrams and energy concentration degree characteristic of the lens. The unit of the horizontal axis of FIG. 6 is μm, the vertical axis represent percentage. The energy concentration degree graph also presents what agrees with the theoretical value 13.5 μm, it can be proved that, on basis of subminiaturization of the Fθ lens, the imaging quality reaches an optical level, the energy concentration degree is high, and an accurate processing can be realized.

The Fθ lens for far-infrared laser processing provided by the invention secures a better imaging quality and a better processing accuracy, and at the same time, the volume of the lens is effectively controlled, the miniaturization of the lens is secured, solving the difficulty of a traditional far-infrared lens to realize a high resolution and a small volume. The cost is effectively controlled, and the lens is suitable for applying to various laser processing/cutting/drilling devices.

The invention further provides a laser processing device, which includes a far-infrared laser and an optical lens configured to focus the far-infrared laser to perform a laser processing. The optical lens can be the Fθ lens for far-infrared laser processing provided by the invention. The lens is particular suitable for a laser with a wavelength of 10640 nm, therefore, the emission wavelength of the far-infrared laser is preferably 10640 nm.

Although the invention has been described with reference to the embodiments thereof and the best modes for carrying out the invention, it is apparent to those skilled in the art that a variety of modifications and changes may be made without departing from the scope of the invention, which is intended to be defined by the appended claims.

What is claimed is:

1. An Fθ lens for far-infrared laser processing, comprising a first lens, a second lens, and a third lens, which are coaxially arranged successively along a transmission direction of an incident light beam;

wherein the first lens is a negative meniscus lens, the second and the third lens are positive meniscus lenses, middle portions of the first, the second and the third lens protrude toward the transmission direction of the incident light beam;

wherein the first lens comprises a first surface and a second surface, the second lens comprises a third surface and a fourth surface, the third lens comprises a fifth surface and a sixth surface, the first surface to six surface are arranged along the transmission direction of the incident light beam;

radiuses of curvature of the first surface to six surface are −50 mm, −60 mm, −68 mm, −50 mm, −500 mm, and −180 mm, respectively, and each has a tolerance of 5%.

2. The Fθ lens for far-infrared laser processing according to claim 1, wherein center thicknesses of the first lens to the third lens are 5 mm, 8 mm, and 8 mm, respectively, and each has a tolerance of 5%.

3. The Fθ lens for far-infrared laser processing according to claim 2, wherein, a distance on an optical axis between the second surface and the third surface is 5 mm;

a distance on the optical axis between the fourth surface and the fifth surface is 0.5 mm;

each of the distances has a tolerance of 5%.

4. The Fθ lens for far-infrared laser processing according to claim 1, further comprising a fourth lens positioned on a light emergent side of the third lens, wherein the fourth lens comprises a seventh surface and a eighth surface, radiuses of curvature of the seventh surface and a eighth surface are ∞.

5. The Fθ lens for far-infrared laser processing according to claim 4, wherein a center thickness of the fourth lens is 3 mm, the tolerance is 5%;

a distance on the optical axis between the sixth surface and the seventh surface is 4 mm with a tolerance of 5%.

6. A laser processing device, comprising a far-infrared laser and an optical lens configured to focus the far-infrared laser to perform a laser processing, wherein the optical lens is the Fθ lens for far-infrared laser processing according to claim 1.

7. The laser processing device according to claim 6, wherein an emission wavelength of the far-infrared laser is 10640 nm.

8. The Fθ lens for far-infrared laser processing according to claim 2, further comprising a fourth lens positioned on a light emergent side of the third lens, wherein the fourth lens comprises a seventh surface and a eighth surface, radiuses of curvature of the seventh surface and a eighth surface are ∞.

9. The Fθ lens for far-infrared laser processing according to claim 3, further comprising a fourth lens positioned on a light emergent side of the third lens, wherein the fourth lens comprises a seventh surface and a eighth surface, radiuses of curvature of the seventh surface and a eighth surface are ∞.

* * * * *